Feb. 17, 1931.
J. C. HULL
1,792,983
DUST DISTRIBUTOR HEAD
Filed Dec. 14, 1929
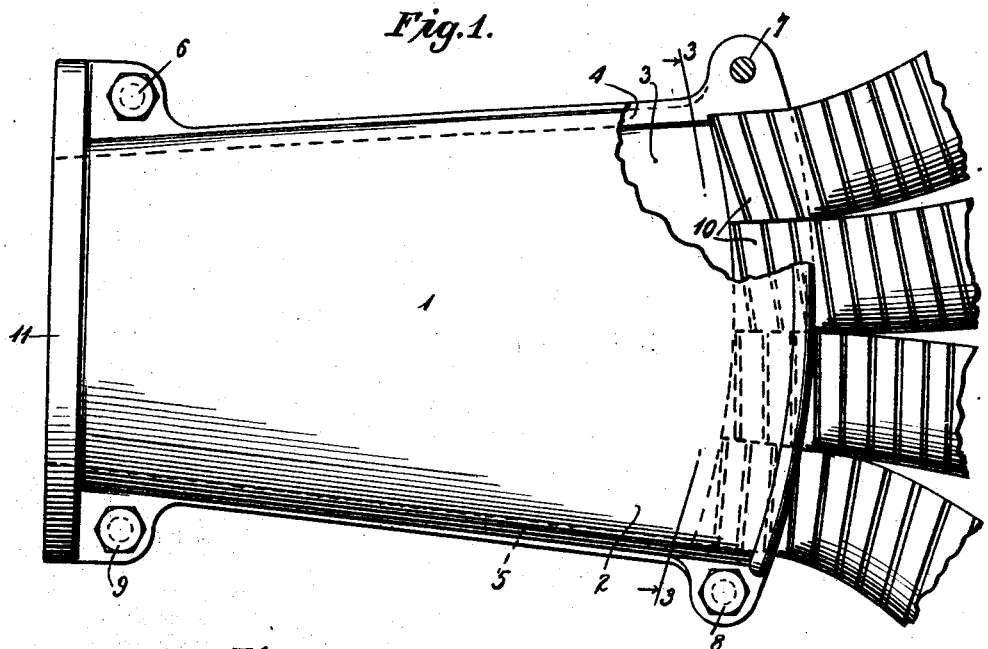
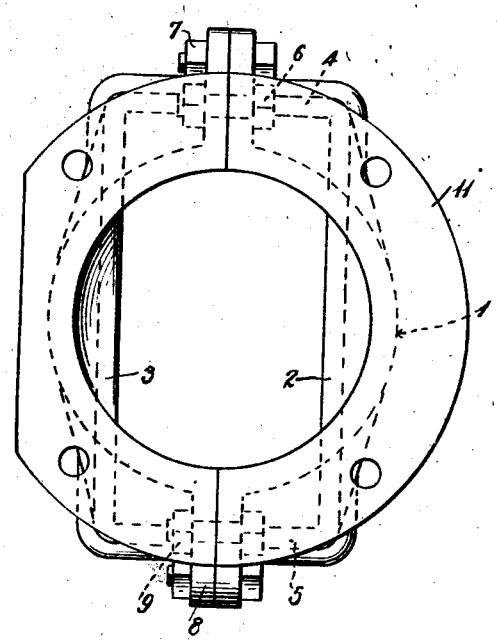
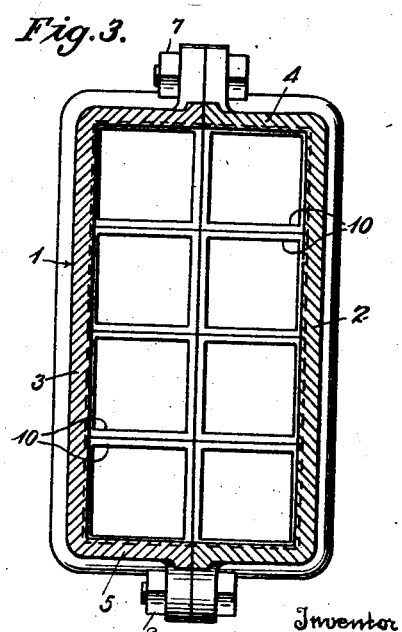
Inventor
John C. Hull
By Bacon & Thomas
Attorneys Feb. 17, 1931. J. C. HULL 1,792,983
DUST DISTRIBUTOR HEAD
Filed Dec. 14, 1929    2 Sheets-Sheet 2

Inventor
John C. Hull
By Ba n Thomas
Attorneys

Patented Feb. 17, 1931

1,792,983

UNITED STATES PATENT OFFICE

JOHN C. HULL, OF GASPORT, NEW YORK

DUST-DISTRIBUTOR HEAD

Application filed December 14, 1929. Serial No. 414,135.

This invention relates to vegetable dusters used to clean vegetables or fruit by spraying currents of air under pressure thereagainst.

The invention has for its particular object the provision of a novel type of distributor box with which all of the pipes leading to the rows of vegetables come into a head and are compactly connected with the distributor box in a manner offering substantially no resistance to the air current.

Other features of the invention will be apparent to those skilled in the art from a reading of the following specification in conjunction with the drawings attached hereto and forming a part hereof, in which—

Figure 1 is a top view, partly in section, of my distributor head;

Figure 2 is an end view;

Figure 3 is a sectional view on lines 3—3 of Figure 1;

Figure 4:
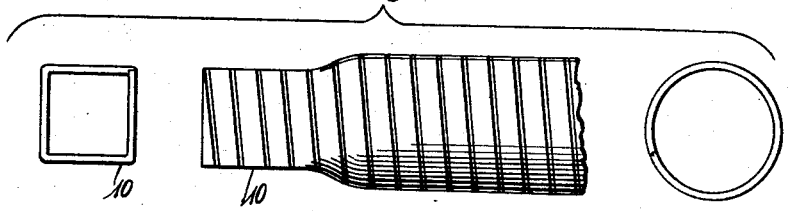
Figure 4 is a detailed view of one of the pipes showing the flattened non-circular ends thereof.

Referring now more particularly to the drawings, the reference numeral 1 indicates a form of distributor box suitable for carrying out my conception. As will be observed, this distributor box is of rectangular cross section having side walls 2 and 3 and upper and lower walls 4 and 5. It preferably is of flaring formation gradually enlarging towards the end thereof with which the duster pipes are connected. This box 1 is of sectional formation as shown in Figure 3 and is bolted together, with the pipes clamped therein, as shown at 6, 7, 8 and 9.

Figure 5:
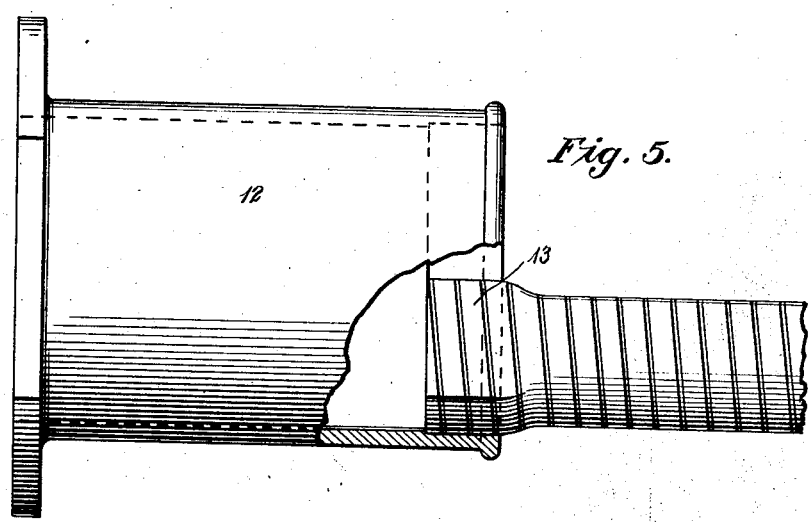
Figure 5 is a view partly in section of a modification wherein the distributor head is of circular formation and wherein triangularly shaped pipe ends are used.
Figure 6:
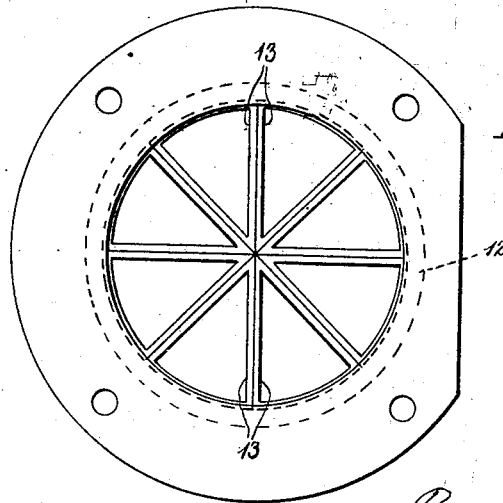
Figure 6 is an end view of the modification shown in Figure 5.

Within the confines of the rectangular box I connect a multiplicity of dusting pipes as shown in Figure 3, the ends of which pipes are preferably of square formation as at 10. A large number of them can be compactly placed within the duster box as will be apparent. By forming the ends of the pipes in this manner they may be nested or grouped and are squeezed into the frame so there is nothing but the thin cutting edge of the pipe to offer resistance which, naturally, reduces the resistance to a minimum or practically eliminates it entirely. On the other hand, when rounded end pipes are employed and are grouped or nested the solid or flat surfaces which must be employed to close the opening between the peripheries thereof interfere substantially with the air current and the free discharge of the full capacity of the blower. As will be apparent, the constricted end of the box 11 is connected in any way desired to the dusting or blowing machine. Figures 5 and 6 disclose a somewhat modified form of the invention but which achieves, in a measure, somewhat the same results. In this embodiment of the invention the duster head may be round as shown by reference numeral 12. However, the pipes in this event are preferably irregularly shaped or shaped in the form of a triangle so that they lie flat against each other as shown in Figure 6 to the end that there is practically no resistance offered to the discharge of the air from the blower. Such a form of distributor box is therefore contemplated by my invention, in its broader aspect. It will be observed that the triangular ends of the hose are shaped as at 13 and are wedged together tightly into the position shown in Figure 6.

Having thus described my invention what I claim is:

1. In a dusting apparatus the combination of a distributor head adapted to be connected at one end to the air blowing apparatus, a plurality of independent pipes adapted to lead to different rows of vegetables or the like, said pipes having flattened surfaces whereby to adapt the same to be nested into close contacting relationship within the end of the distributor head.

2. In combination, a distributor head adapted to be connected at one end to a blower apparatus, a plurality of pipes secured to the distributor head and leading to diverse spaced directions therefrom, said pipes being flattened at their ends whereby they may be tightly nested together and secured in that manner to the distributor head, 3. In a dusting apparatus, the combination of a distributor head of substantially rectangular cross section and having one end adapted for connection to a blower mechanism, a plurality of discharging pipes having their inner ends provided with rectangularly shaped terminals, said terminals being adapted to be placed upon one another and retained within the adjacent end of the rectangularly shaped distributor head whereby to prevent interference with the free discharge of the full capacity of the blower.

4. In a dusting apparatus for vegetables or the like, the combination of a distributor box of substantially rectangular cross section, said distributor box gradually tapering in cross section from the inlet to the outlet thereof, means for connecting the inlet to a blowing apparatus, a plurality of pipes adapted to lead to different rows of vegetables or the like connected to said distributor box, said pipes having their inner ends provided with flattened surfaces whereby to permit the nesting thereof in close relationship to prevent interference of the free discharge of the full capacity of the air blown through the distributor box and the pipes.

5. In a vegetable dusting apparatus of the class described, the combination of a distributing box of sectional formation and of rectangular cross section, means for connecting the inlet of the distributor box to the blower apparatus, a plurality of independent pipes secured to the distributor box at the outlet end thereof, said pipes having flattened surfaces adapted for face contact with each other whereby they may be compactly nested without substantial interference to the air current discharged therethrough and means for securing the sections of the distributor box together to bind the ends of the tubes in their nested relationship.

In testimony whereof I affix my signature.

JOHN C. HULL.